(12) United States Patent
Meinerth et al.

(10) Patent No.: US 6,199,149 B1
(45) Date of Patent: Mar. 6, 2001

(54) OVERLAY COUNTER FOR ACCELERATED GRAPHICS PORT

(75) Inventors: Kim A. Meinerth, Granite Bay; Aditya Sreenivas, El Dorado Hills; Krishnan Sreenivas, Rancho Cordova, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/016,790

(22) Filed: Jan. 30, 1998

(51) Int. Cl.[7] .................................................. G06F 12/02
(52) U.S. Cl. ......................... 711/167; 711/151; 711/152; 713/502; 345/501
(58) Field of Search .................................... 711/150, 151, 711/152, 167; 710/200, 244; 713/502; 345/190, 501

(56) References Cited

U.S. PATENT DOCUMENTS

| | | | |
|---|---|---|---|
| 5,319,388 | * | 6/1994 | Mattison et al. ...................... 345/190 |
| 5,664,161 | * | 9/1997 | Fukushima et al. .................. 345/501 |
| 5,812,789 | * | 9/1998 | Diaz et al. ............................ 709/247 |
| 5,818,464 | * | 10/1998 | Wade .................................... 345/501 |
| 5,941,968 | * | 8/1999 | Mergard et al. ...................... 710/128 |

* cited by examiner

Primary Examiner—Hiep T. Nguyen
(74) Attorney, Agent, or Firm—Blakely, Sokoloff, Taylor & Zafman LLP

(57) ABSTRACT

A method for controlling processing of overlay requests is disclosed. The method comprises the step of disabling an overlay request to a memory. The overlay request to system memory has expedited processing priority over requests to a system memory by other devices. The overlay request is disabled for a predetermined time period and enabled after the predetermined time period has elapsed.

30 Claims, 6 Drawing Sheets

OVERLAY COUNTER FOR ACCELERATED GRAPHICS PORT

BACKGROUND OF THE INVENTION

(1) Field of the Invention

The present invention is in the field of memory access; more specifically, the present invention is related to a method and apparatus for an overlay counter for an accelerated graphics port.

(2) Related Art

A typical graphics device in a computer system has expedited priority in accessing a system memory over other system devices. In currently available systems, lower priority devices must wait their turn to access the system memory. Because a graphics device is assigned expedited priority, a graphics device may indirectly cause other devices vying for access to the system memory to fail by depriving them of access time. However, in order to output graphics information to a user in a timely fashion, it is imperative for the graphics device to maintain its expedited priority status.

It is therefore desirable to provide a method and an apparatus to allow system memory access requests by other devices to be honored without jeopardizing expedited priority status of a graphics device.

BRIEF SUMMARY OF THE INVENTION

A method and apparatus for controlling processing of overlay requests is disclosed. One embodiment of the method comprises the step of disabling an overlay request to a memory. The overlay request to system memory has expedited processing priority over requests to a system memory by other devices. The overlay request is disabled for a predetermined time period and enabled after the predetermined time period has elapsed.

DETAILED DESCRIPTION OF THE INVENTION

The present invention is a mechanism to allow a graphics driver to program the number of cycles between accelerated graphics port (AGP) expedited access by a graphics device for an overlay display stream. Overlay is the ability to superimpose text or graphics onto motion or still videos.

Figure 1:
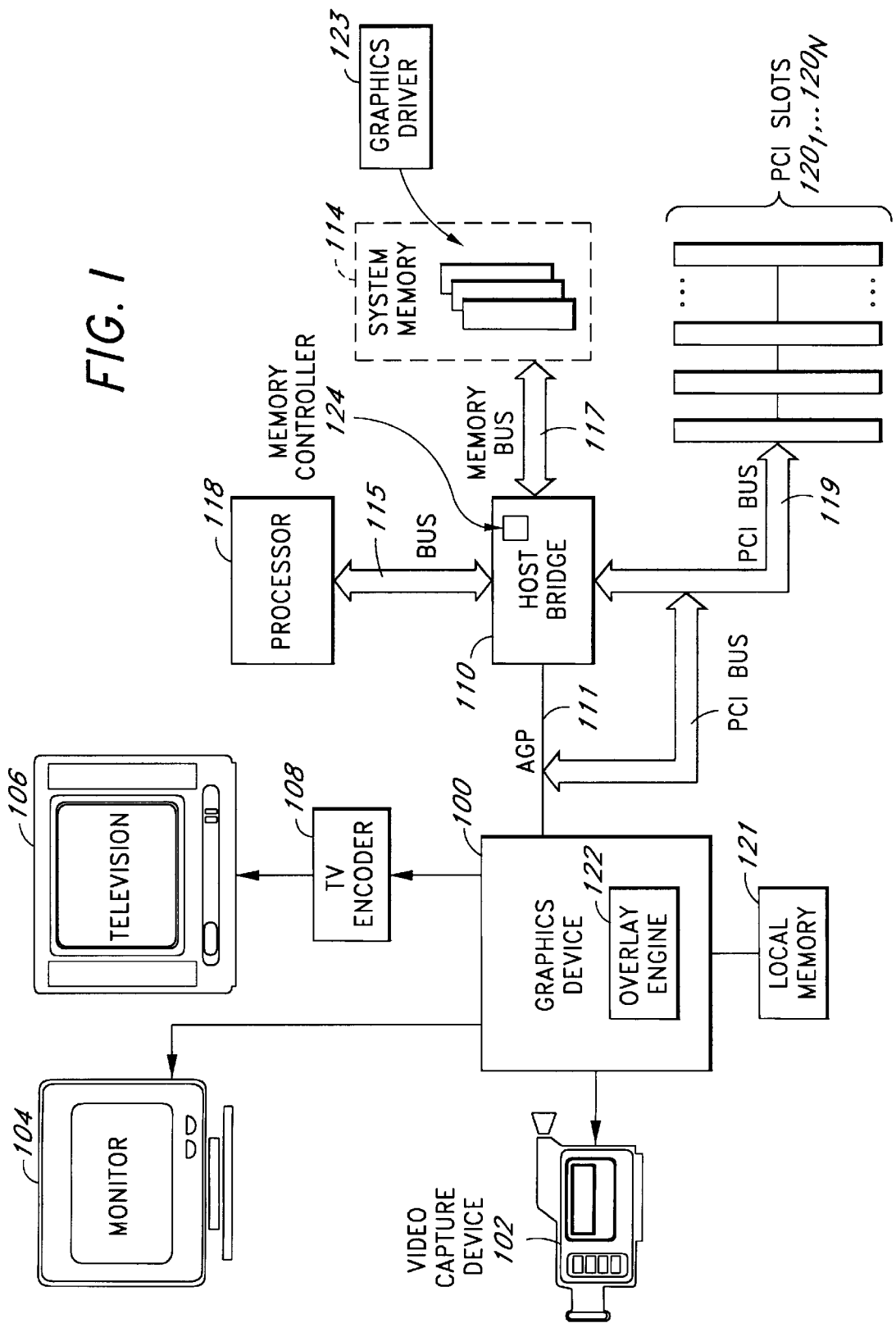
FIG. 1 illustrates an exemplary computer system having the present invention's overlay counter.

FIG. 1 illustrates an exemplary computer system having the present invention's mechanism for controlling AGP requests to system memory. A graphics device 100 which is supported by a graphics driver 123 is capable of accepting video data from a video capture device 102 and processing the video data for display to a video display device such as a computer monitor 104 or a television monitor 106 through an encoder 108.

The graphics device 100 is coupled to a system memory 114 through an AGP 111 and a host bridge 110. The AGP 111 is a port supported by the graphics device of the host bridge 110. In one embodiment, the AGP 111 is designed to optimize the graphics data transfer operations in high speed personal computers (PC). The host bridge 110 is also coupled to a processor 118 through a bus 115 and PCI devices $120_1$ through $120_N$ through a bus 119 and provides access to the system memory 114 through memory bus 117. The processor as referred to herein may be an Intel Pentium® II processor.

The PCI devices $120_1$ through $120_N$ are input/output hardware devices coupled to the system through, for example, a PCI expansion connector (not shown) or mounted to the personal computer (PC) motherboard (not shown). Examples of PCI devices include, but are not limited to, a graphics controller/card, a disk controller/card, a local area network (LAN) controller/card and a video controller/card.

The graphics device 100 is also coupled to a local memory 121 and has an overlay engine 122. The local memory 121 stores a front buffer (not shown) with a next video frame to be displayed. The overlay engine 122 provides data used in superimposing graphics onto motion or still video for display and operates during horizontal retrace when a primary display engine (not shown) is inactive. The primary display engine (not shown) of the graphics device processes the video images for display on a display device. To operate during the horizontal retrace when the primary display engine is inactive, the overlay engine 122 is required to generate requests to the AGP 111 as quickly as possible.

All overlay requests to the system memory 114 by the overlay engine 122 are treated as expedited requests resulting in the overlay requests receiving the highest priority by a memory controller 124 which controls access to the system memory 114. To prevent the overlay requests from monopolizing access to the system memory 114, the present invention ensures that there are a few idle clocks between processing of overlay requests. In this way, the processor 118 and PCI devices $120_1 \ldots 120_N$ are given a chance to access the system memory 114 without undue delay.

Figure 2:
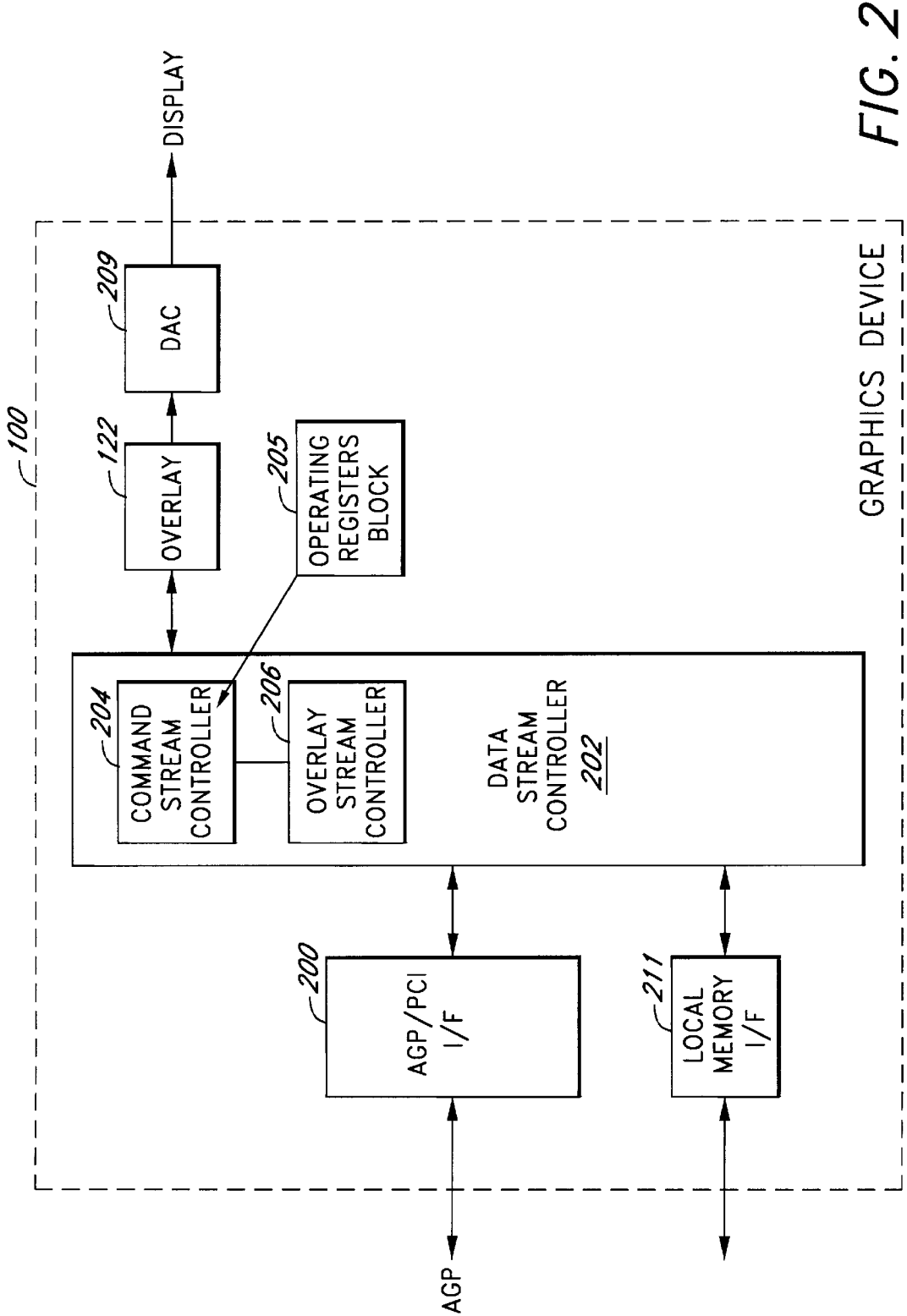
FIG. 2 illustrates an exemplary block diagram of a graphics device.

FIG. 2 illustrates an exemplary block diagram of the graphics device referred to in FIG. 1. The graphics device has an AGP/PCI interface 200 through which the graphics device 100 transmits and receives information from the host bridge 110. The AGP/PCI interface 200 is in turn coupled to a data stream controller 202, which has multiple controllers capable of processing various data including, but not limited to, a command stream controller 204 and an overlay stream controller 206.

The command stream controller 204 processes instructions received by the graphics device 100 from the processor 118, system memory 114 and/or the PCI devices and has an operating registers block 205.

A predetermined number of clock cycle which must elapse between each AGP request to the system memory is generated by a graphics driver and transmitted to the graphics device 100 from the host bridge 110 through the AGP 111. More specifically, the graphics driver performs a PCI write transaction to the graphics device 100 and causes an overlay timer value to be written into the command stream controller 204's operating registers block 205 for access by the overlay stream controller 206.

The overlay requests are processed when the time period specified by the overlay timer value has elapsed, or when the overlay request is to the local memory 105 and not an AGP request to the system memory 114.

Once it is determined that the pending overlay request may be processed, the overlay stream controller 206 fetches the overlay data from either the local memory 105 through a local memory interface (I/F) 211 or from the system memory 114 through the AGP 111 as AGP requests. The overlay data is then forwarded to the overlay engine 122 for processing. Finally, the processed overlay data is converted into analog form by, for example, a digital-to-analog converter (DAC) 209 to be output to a display device.

Figure 3:
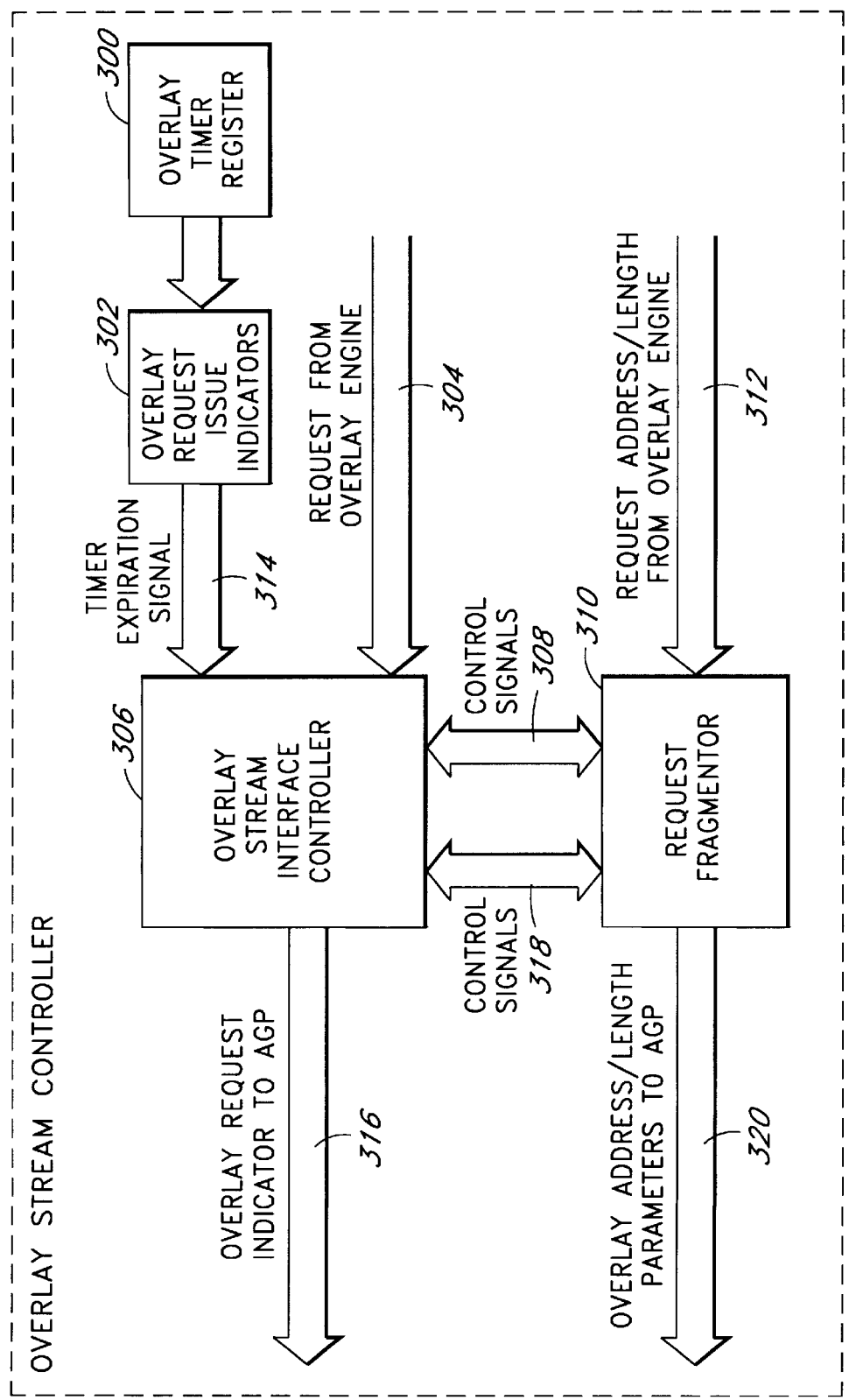
FIG. 3 illustrates a block diagram of one embodiment of an overlay stream controller of the present invention.

FIG. 3 illustrates a block diagram of the overlay stream controller 206 of the graphics device 100. The overlay engine 122 asserts a request signal 304 during horizontal retrace to fetch a scanline worth of overlay data from the system memory. The request signal 304 from the overlay engine 122 indicating that an overlay request is being made is input to an overlay stream interface controller 306. The overlay stream interface controller 306 responds by notifying the AGP 111 through an overlay request indicator signal 316 and notifying a request fragmentor 310 through a control signal 308 that an overlay request is pending. The overlay engine 122 also forwards the overlay request to a request fragmentor 310.

The request fragmentor 310 is coupled to the overlay stream interface controller 306 and is responsible for fragmenting the overlay request from the overlay engine 122 into smaller requests for overlay data. In response to the control signal 308, the request fragmentor 310 retrieves address and length information 320 of the data being requested from the overlay request.

Meanwhile, an overlay timer value is generated by the graphics driver and saved in the operating registers block 205 of the command stream controller 204. This overlay timer value is forwarded to an overlay timer register 300. The overlay timer value is then input to an overlay request issue indicator 302. The overlay request issue indicator 302 is coupled to the overlay stream interface controller 306 and determines when the overlay stream interface controller 306 can make an overlay request to the system memory 114 through the AGP 111. More specifically, the overlay request issue indicator 302 counts the predetermined length of clock pulse equivalent to the time period defined by the overlay timer value. The overlay request issue indicator 302 disables the pending overlay request until the time period defined by the overlay timer value has elapsed. The overlay request issue indicator 302 then generates a timer expiration signal 314 to the overlay stream interface controller 306.

Once the overlay request issue indicator 302 generates a timer expiration signal 314 to the overlay stream interface controller 306, the overlay stream interface controller 306 asserts an overlay request indicator signal 316 to the AGP 111 indicating that the pending overlay request may now be processed. The overlay stream interface controller 306 also inputs an overlay request enable signal 318 to the request fragmentor 310 indicating that the request fragmentor 310 may now forward address and length information to the AGP 111. When a request is accepted by the AGP 111 in response to the overlay request indicator 316, the request fragmentor 310 computes the address and length information for the next request to be issued. The starting address and the length 320 of the requested data are then made available to the AGP 111.

The host bridge 110 receives the overlay request indicator signal 316 and the overlay address/length parameter 320 from the graphics device 100 through the AGP 111 and forwards the overlay request indicator signal 316 and the overlay address/length parameter 320 to the system memory 114 for processing.

Figure 4:
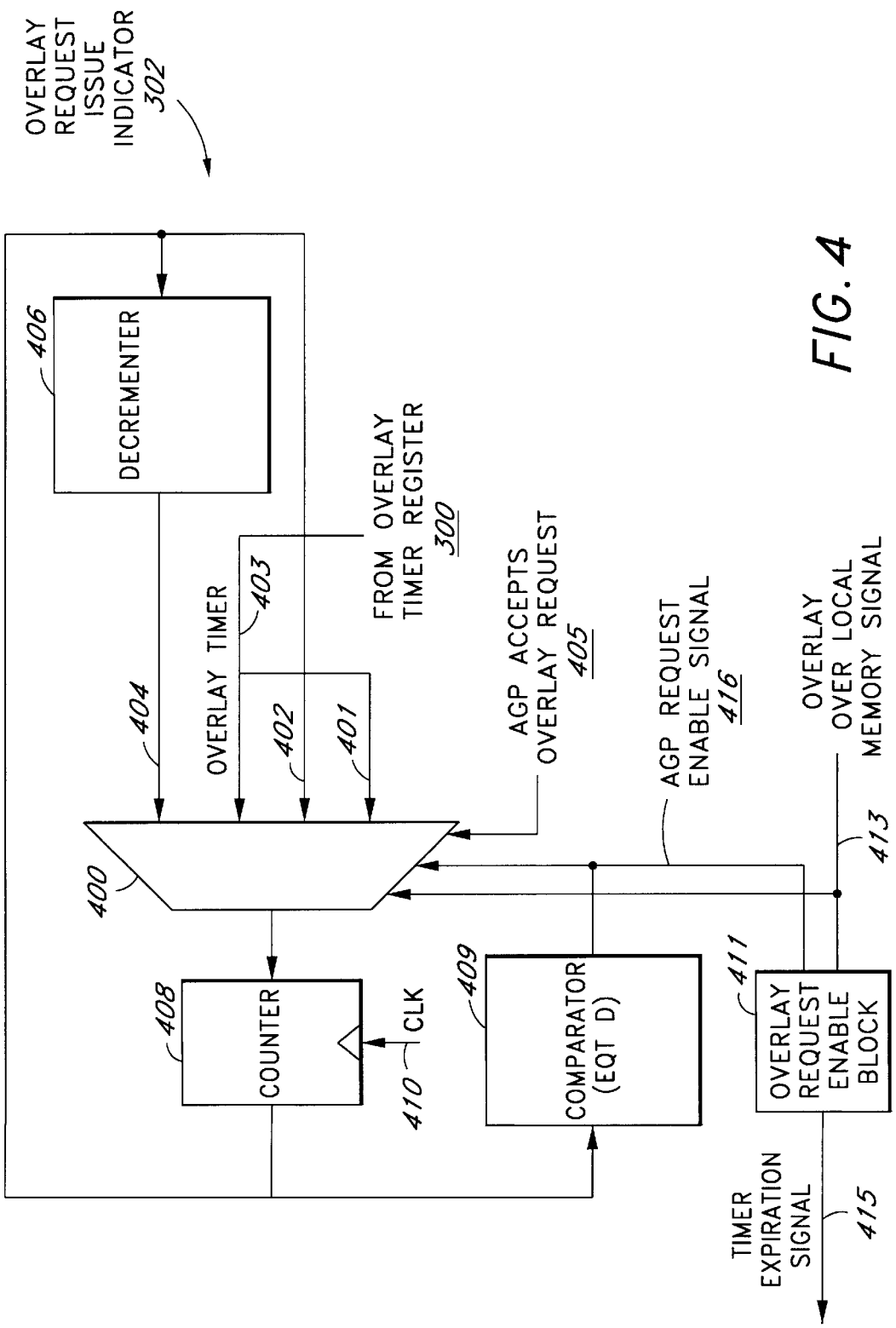
FIG. 4 illustrates one embodiment of an overlay request issue indicator of the present invention.

FIG. 4 illustrates the overlay request issue indicator 302 illustrated in FIG. 3. A multiplexor 400 has lines 401, 402, 403 and 404. The input to lines 401 and 403 is an overlay timer value from the overlay timer register and designates the time period which must elapse between AGP requests to the system memory 114. Line 404 is the overlay timer value processed by a decrementor 406. Line 404 is selected for processing if an AGP accept signal 405 indicating that the AGP 111 has accepted an overlay request for processing and the system may begin counting the overlay time value period anew. Line 402 is the overlay timer value bypassing processing by the decrementor 406. Line 402 is selected by the multiplexor 400 until it receives the AGP accept signal 405.

A counter 408 receiving clock signal 410 is reset to zero and is loaded with the overlay timer value through the multiplexor 400. The AGP accepts signal 405 is forwarded by the AGP upon accepting an overlay request to system memory, the multiplexor 400 begins forwarding the overlay timer value to be decremented by the decrementor 406 to the counter 408. At every clock pulse, the counter 408 outputs the overlay timer value and forwards the overlay timer value to the decrementor 406 and a comparator 409. The overlay timer value is decremented by the decrementor 406. At the comparator 409, the overlay timer value is compared to a zero.

If the overlay timer value is equal to zero, an AGP request enable signal 416 is generated by the comparator 409 indicating that the time period defined by the overlay timer value has elapsed and the pending overlay request to AGP may be processed. The AGP request enable signal 416 is then forwarded to an overlay request enable block 411.

The overlay request enable block 411 may also accept a local memory enable signal 413 whenever it is generated by the overlay engine 122 regardless of whether the time period defined by the overlay timer value has elapsed. The local memory enable signal 413 is enabled if the overlay request is to local memory 105 and not to system memory 114.

The local memory enable signal 413 and the AGP request enable signal 416 are also fed to the multiplexor 400 to stop the decrementing of the overlay value by the overlay request issue indicator 302. The multiplexor 400 then selects line 402 which bypasses processing by the decrementor 406.

In response to either the AGP request enable signal 416 or the local memory enable signal 413, the overlay request enable block 411 outputs a timer expiration signal 415 to the overlay stream interface controller (306 in FIG. 3).

The timer expiration signal 415 input to the overlay stream interface controller causes the overlay stream interface controller 306 to generate an overlay request indicator to the AGP 111. The pending overlay request to the AGP 111 is then processed.

Although a decrementor is used in the illustration, in an alternate embodiment, an incrementor may be used in lieu of a decrementor to increment up to a predetermined maximum overlay timer value.

Figure 5A:
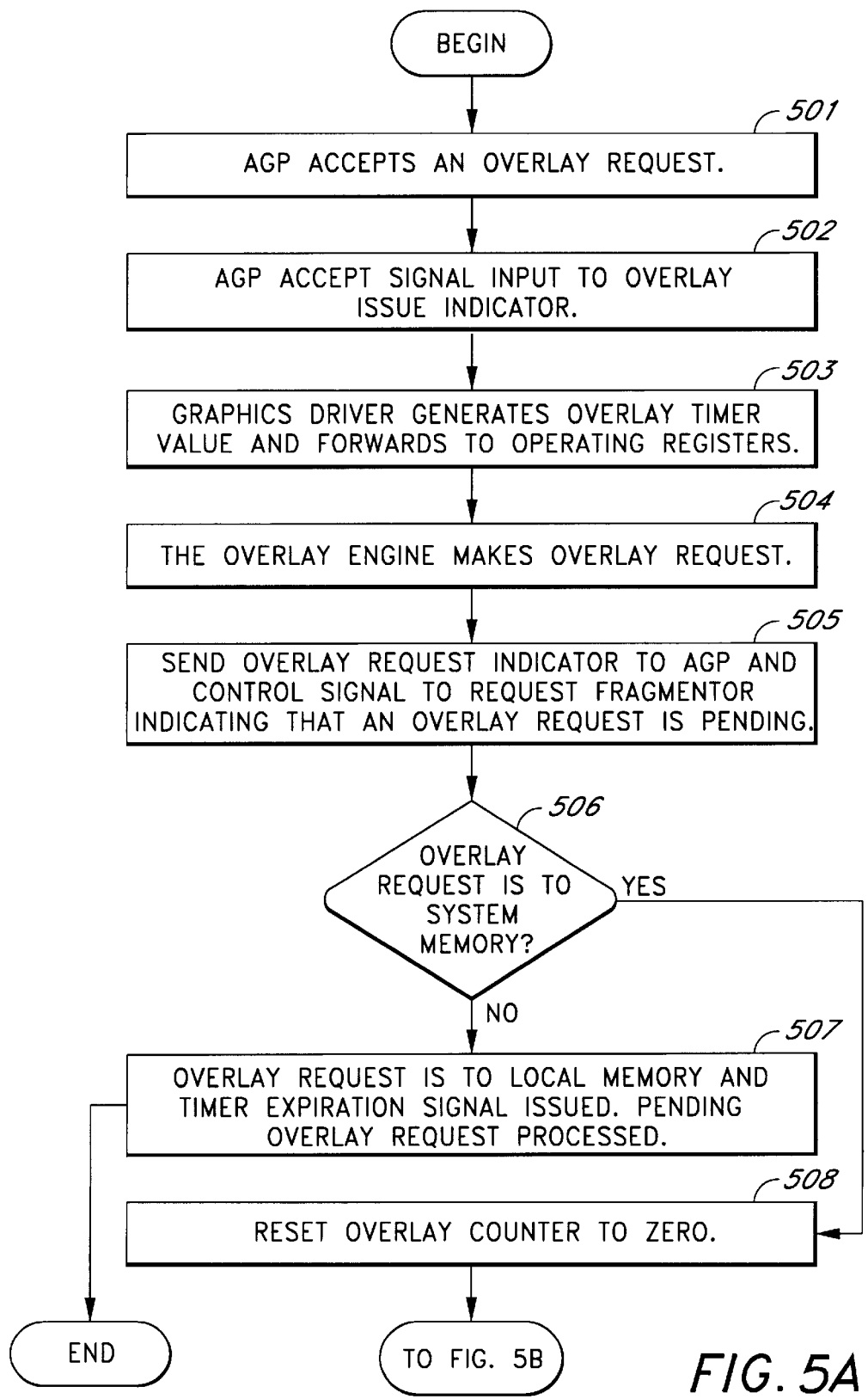
FIGS. 5a and 5b are flow diagrams illustrating the general steps followed by one embodiment of the present invention.
Figure 5B:
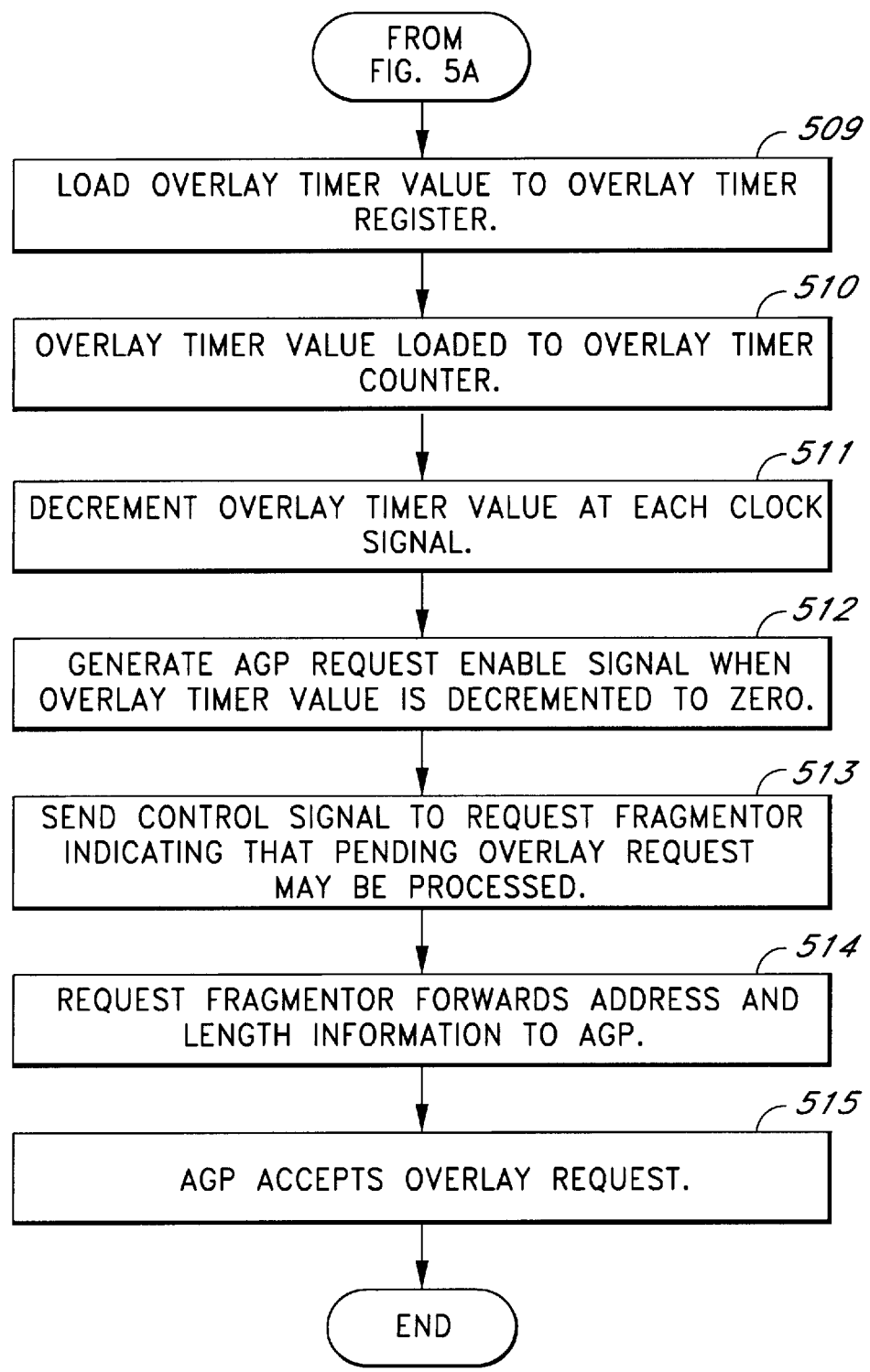

FIGS. 5a and 5b are flow diagrams illustrating the general steps followed by the present invention. In step 501, the AGP 111 is ready to transfer an overlay request. In step 502, an AGP accept signal is input to the overlay request issue indicator 302 which initiates the decementing of the overlay timer value. In step 503, the graphics driver 123 generates the overlay timer value and forwards the overlay timer value to the command stream controller 204's operating register block 205. In step 504, an overlay request is made by the overlay engine 122. In step 505, the overlay stream interface controller 306 notifies the AGP 111 and the request fragmentor 310 that an overlay request is pending. In step 506, the overlay request issue indicator 302 determines whether the overlay request is to the system memory 114 through the AGP 111 or to the local memory 121. If the overlay engine 122 forwards a local memory enable signal 413, then the overlay issue indicator 302 determines that the overlay request is to the local memory 121.

In step 507, if the overlay request is to the local memory 121, then a timer expiration signal is issued by the overlay request issue indicator 302 and the pending overlay request is processed. Otherwise, if the overlay request is to the system memory114, then in step 508, an overlay timer counter 408 is reset to zero. In step 509, the overlay timer value is loaded into an overlay timer register 300. In step 510, the overlay timer counter is loaded with the contents of the overlay timer register 300. In step 511, at every clock pulse as counted by the counter, a decrementor 406 decrements the overlay timer value until it reaches zero.

In step 512, an AGP request enable signal is generated in response to the overlay timer value reaching zero. The AGP request enable signal stops the overlay request issue indicator 302 from further processing the overlay timer value and allows a timer expiration signal to be fed to an overlay stream interface controller 306. In step 513, the overlay stream interface controller 306 sends a control signal to the request fragmentor 310 notifying the request fragmentor 310 that the pending overlay request may be processed.

In step 514, the request fragmentor 310 forwards the starting address and the length of the overlay data requested by the overlay engine 122 to the AGP 111. In step 515, the AGP forwards the overlay request along with the address and length information to the system memory 114 through the host bridge 110 for processing.

What has been described is a method and apparatus for having a predetermined time period elapse between each overlay requests to system memory through the AGP without the need to change the overlay request's expedited processing priority. In this way, other devices including the processor and the PCI devices are allowed to access the system memory without undue delay.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed:

1. A method comprising:
   disabling an overlay request to a memory having expedited processing priority over requests to a system memory by other devices, said disabling being performed for a predetermined time period; and
   enabling said overlay request after said predetermined time period has elapsed.

2. The method of claim 1 further comprising processing said overlay request if said overlay request is to local memory.

3. The method of claim 1 wherein said overlay request is to system memory.

4. The method of claim 3 further comprising providing an overlay counter with said predetermined time period.

5. The method of claim 4 further comprising counting to a predetermined final value.

6. The method of claim 4 further comprising decrementing said predetermined time period until said decrementing results in a predetermined minimum value.

7. The method of claim 4 further comprising incrementing said predetermined time period until said incrementing results in a predetermined maximum value.

8. The method of claim 4 further comprising generating a request enable signal to an overlay stream interface controller.

9. The method of claim 8 further comprising notifying an accelerated graphics port (AGP) that said overlay request to system memory is pending, said AGP facilitating access to said system memory for said overlay request.

10. The method of claim 9 further comprising notifying a request fragmentor that said overlay request to system memory is ready for processing.

11. The method of claim 10 further comprising forwarding a starting address and a length to said AGP, said starting address and length for an overlay data requested through said overlay request to system memory.

12. An apparatus comprising:
    an overlay request issue indicator configured to counting a predetermined time period, an overlay request to a system memory being disabled while said overlay timer is counting, said overlay request having expedited processing priority over requests to said system memory by other devices; and
    an overlay controller coupled to said overlay request issue indicator, said overlay controller configured to enable the processing of an overlay request after said predetermined period has elapsed.

13. The apparatus of claim 12 further comprising an accelerated graphics port (AGP) through which said overlay request is made to said system memory, when said predetermined time period has elapsed said AGP coupled to said overlay stream interface controller.

14. The apparatus of claim 12 wherein said overlay request issue indicator further comprises an overlay counter configured to count to a predetermined final value.

15. The apparatus of claim 13 wherein said overlay request issue indicator further comprises a counter for outputting said predetermined value at each clock pulse.

16. The apparatus of claim 14 wherein said overlay request issue indicator further comprises a decrementor coupled to said counter, said decrementor configured to decrementing said predetermined value down to a predetermined minimum value.

17. The apparatus of claim 14 wherein said overlay request issue indicator further comprises an incrementor coupled to said counter, said incrementor configured to incrementing said predetermined value up to a predetermined maximum value.

18. The apparatus of claim 14 further wherein said overlay issue indicator issues a timer expiration signal to said overlay stream interface controller in response to a said predetermined final value being reached.

19. The apparatus of claim 18 wherein said overlay stream interface controller notifies said AGP and a request fragmentor that said overlay request to system memory is pending and that said timer expiration signal has issued.

20. The apparatus of claim 18 further comprising said request fragmentor coupled to said overlay stream interface controller, said request fragmentor configured to forward a starting address and length of data requested through said overlay request to said system memory in response to said overlay stream interface controller notifying said request fragmentor that said overlay request to system memory is pending and said timer expiration signal has been issued.

21. The apparatus of claim 20 wherein said AGP accepts said overlay request and facilitates processing of said overlay request to said system memory.

22. A system comprising:
a graphics device including,
an overlay request issue indicator configured to counting a predetermined time period, an overlay request to a system memory being disabled while said overlay timer is counting, said overlay request having expedited processing priority over requests to said system memory by other devices, and
an overlay controller coupled to said overlay request issue indicator, said overlay controller configured to enable the processing of an overlay request after said predetermined period has elapsed; and
an accelerated graphics port (AGP) coupled to said graphics device, said AGP configured to facilitate said overlay request to system memory.

23. The system of claim 22 wherein said overlay request issue indicator further comprises an overlay counter configured to count to a predetermined final value.

24. The system of claim 23 wherein said overlay request issue indicator further comprises a counter for outputting said predetermined value at each clock pulse.

25. The system of claim 24 wherein said overlay request issue indicator further comprises a decrementor coupled to said counter, said decrementor configured to decrementing said predetermined value down to a predetermined minimum value.

26. The system of claim 24 wherein said overlay request issue indicator further comprises an incrementor coupled to said counter, said incrementor configured to incrementing said predetermined value up to a predetermined maximum value.

27. The system of claim 23 further wherein said overlay issue indicator issues a timer expiration signal to said overlay stream interface controller in response to a said predetermined final value being reached.

28. The system of claim 27 wherein said overlay stream interface controller notifies said AGP and a request fragmentor that said overlay request to system memory is pending and that said timer expiration signal has issued.

29. The system of claim 28 further comprising said request fragmentor coupled to said overlay stream interface controller, said request fragmentor configured to forward a starting address and length of data requested through said overlay request to said system memory in response to said overlay stream interface controller notifying said request fragmentor that said overlay request to system memory is pending and said timer expiration signal has been issued.

30. The system of claim 29 wherein said AGP accepts said overlay request and facilitates processing of said overlay request to said system memory.

* * * * *